United States Patent [19]

Yonemura et al.

[11] Patent Number: 5,629,066
[45] Date of Patent: May 13, 1997

[54] RESIN ARTICLE HAVING ANTI-STATIC PROPERTY

[75] Inventors: Utami Yonemura; Tsuneo Hagiwara, both of Hino, Japan

[73] Assignee: Teijin Limited, Osaka, Japan

[21] Appl. No.: 377,032

[22] Filed: Jan. 23, 1995

Related U.S. Application Data

[63] Continuation of Ser. No. 900,447, Jun. 18, 1992, abandoned.

[30] Foreign Application Priority Data

| Jun. 19, 1991 | [JP] | Japan | 3-173323 |
| Jul. 1, 1991 | [JP] | Japan | 3-185905 |
| Jul. 1, 1991 | [JP] | Japan | 3-185906 |
| Jul. 29, 1991 | [JP] | Japan | 3-210412 |

[51] Int. Cl.$^6$ ................................................. G11B 5/66
[52] U.S. Cl. ................... 428/64.3; 428/64.6; 428/65.1; 428/65.3; 428/65.5; 428/64.7; 428/694 ML; 428/694 DE; 428/694 ST; 428/694 BR; 428/694 SL; 428/694 SG; 428/332; 428/336; 428/412; 428/423.1; 428/447; 428/480; 428/483; 428/500; 428/522; 428/900
[58] Field of Search ................ 428/694 ML, 694 DE, 428/694 ST, 694 BR, 694 SL, 694 SG, 900, 332, 336, 412, 423.1, 480, 447, 483, 500, 522, 64.3, 64.6, 65.1, 65.3, 65.5, 64.7

[56] References Cited

U.S. PATENT DOCUMENTS

| 4,152,487 | 5/1979 | Yanagisawa | 478/621 |
| 4,188,433 | 2/1980 | Dijkstra et al. | 428/64.7 |
| 4,313,764 | 2/1982 | Tracy et al. | 525/123 |
| 4,601,950 | 7/1986 | Iida | 478/421 |
| 4,610,930 | 9/1986 | Masudu | 428/694 |
| 4,895,927 | 1/1990 | Lundemann et al. | 528/321 |
| 4,898,915 | 2/1990 | Harwood et al. | 525/326.7 |
| 4,992,316 | 2/1991 | Ogawa | 428/65.5 |
| 5,091,269 | 2/1992 | Kondo | 428/634 |

FOREIGN PATENT DOCUMENTS

| 0421345 | 4/1991 | European Pat. Off. |
| 1269508 | 10/1989 | Japan |
| 2225536 | 9/1990 | Japan |
| 340261 | 9/1959 | Switzerland |

*Primary Examiner*—Leszek Kiliman
*Attorney, Agent, or Firm*—Sughrue, Mion, Zinn, Macpeak & Seas

[57] ABSTRACT

A resin article comprising a shaped body of a synthetic resin having a surface, and a coated resin layer covering the surface of the shaped body, said coated resin layer being made of an amino group-containing polymer and/or a polymer containing (meth) acrylate of (iso)cyanuric acid as a constituent unit and having a top surface, wherein the top surface of the coated resin layer is chemically converted to have an anti-static property by chemical reaction with a quaternary compound-forming reagent. Alternatively, a resin article having stable anti-static properties may comprise a shaped body of a synthetic resin covered with an anti-static coating layer made of a reaction product of at least one of an amino group-containing alkoxy silane, an amino group-containing alkoxy titanium compund, or an oligomer thereof, with a quaternary compound-forming reagent.

12 Claims, 1 Drawing Sheet

RESIN ARTICLE HAVING ANTI-STATIC PROPERTY

This is a continuation of application Ser. No. 08/900,447 filed Jun. 18, 1992, now abandoned.

BACKGROUND OF THE INVENTION

1. Field of the Invention

The present invention relates to a resin article having an anti-static property.

2. Description of the Related Art

Synthetic resin articles such as synthetic resin films and sheets are widely used in packaging materials for various articles, electric and electronic parts, or other shaped articles, due to their light weight, thermal insulation property, and easy formability, etc. Nevertheless, synthetic resin articles are easily static-charged to cause problems in the processing or machining thereof, or adsorb small particles and dust to thus detriorate the appearance thereof.

The anti-static property to a synthetic resin article is provided by mixing or adding a surface active agent as an anti-static agent to a synthetic resin, or by coating a surface of the synthetic resin article with a surface active agent. Nevertheless, in the former case, to obtain sufficient anti-static property, a large amount of a surface active agent must be added into the synthetic resin, and as a result, the properties of the synthetic resin, for example, the mechanical or optical properties, are deteriorated. In the latter case, the provided surface active agent is easily removed by rabbing, abrasion, migration, etc., and the anti-static property disappears.

It is also known to coat a synthetic resin article with a polyethylene glycol-containing polymer, such as an acrylate of polyethylene glycol, the polyethylene glycol, a constituent unit, being known to exhibit an anti-static effect. Nevertheless, this polymer coating has a low durability to the environment or weather. It is easily hydrolyzed at a high temperature and high humidity, to thereby cause a clouding and peeling of the coating.

Therefore, the object of the present invention is to provide a resin article having a thin coating for making the surface thereof anti-static, which is stable even at a high temperature and high humidity.

SUMMARY OF THE INVENTION

To attain the above object of the present invention, in accordance with the first aspect of the present invention, there is provided a resin article comprising a shaped body of a synthetic resin having a surface, and a coated resin layer covering the surface of the shaped body, said coated resin layer being made of an amino group-containing polymer and/or a polymer containing (meth)acrylate of (iso)cyanuric acid as a constituent unit and having a top surface, wherein the top surface of the coated resin layer is chemically converted to have an anti-static property by chemical reaction with a quaternary compound-forming reagent. This chemical conversion is obtained by, after forming the coated resin layer on the shaped body, treating the top surface of the coated resin layer with a quaternary compound-forming reagent.

In this resin article, the anti-static property is given to the resin article by a chemical conversion of the surface of a coated resin layer formed on the resin article. It is only the surface region that the anti-static property concerns and in that the chemical conversion occurs. Accodingly, said chemical conversion of the surface of the coated resin layer is sufficient to provide a desired anti-static property to the resin article. Further, since the chemical conversion occurs only on the surface of the coated layer, the chemical conversion does not affect the coated resin layer, allowing it to retain the original mechanical and optical properties, etc. thereof. The adhesion of its coated resin layer to the resin article is not lowered. Further, since the chemical conversion is formed through a chemical bond, the binding force of the converted portion (sublayer) to the remaining portion of the coated resin layer is high and the anti-static property of the resin article can be highly durable.

In a second aspect of the present invention, there is also provided a resin article comprising a shaped body of a synthetic resin covered with an anti-static coating layer, said anti-static coating layer being made of a reaction product of at least one selected from the group consisting of an amino group-containing alkoxy silane having the general formula (II), an amino group-containing alkoxy titanium compound having the general formula (III), and an oligomer thereof, with a quaternary compound-forming reagent:

where $R^5$ and $R^6$ stand for hydrogen, aminoalkyl or alkyl, $R^7$ stands for alkylene, $R^8$ stands for alkyl having 1 to 4 carbon atoms or aralkyl, n and m are integers, and the formulae: $n \geq 1$, $m \geq 2$ and $n+m=4$ are satisfied.

In this second aspect of the present invention, since an amino group-containing alkoxy silane or an amino group-containing alkoxy titanium compound or an oligomer thereof used for forming the anti-static coating layer has a high adhesion to a resin subsrate, the anti-static coating layer of the resin article can be highly durable.

DESCRIPTION OF THE PREFERRED EMBODIMENTS

Figure 1:
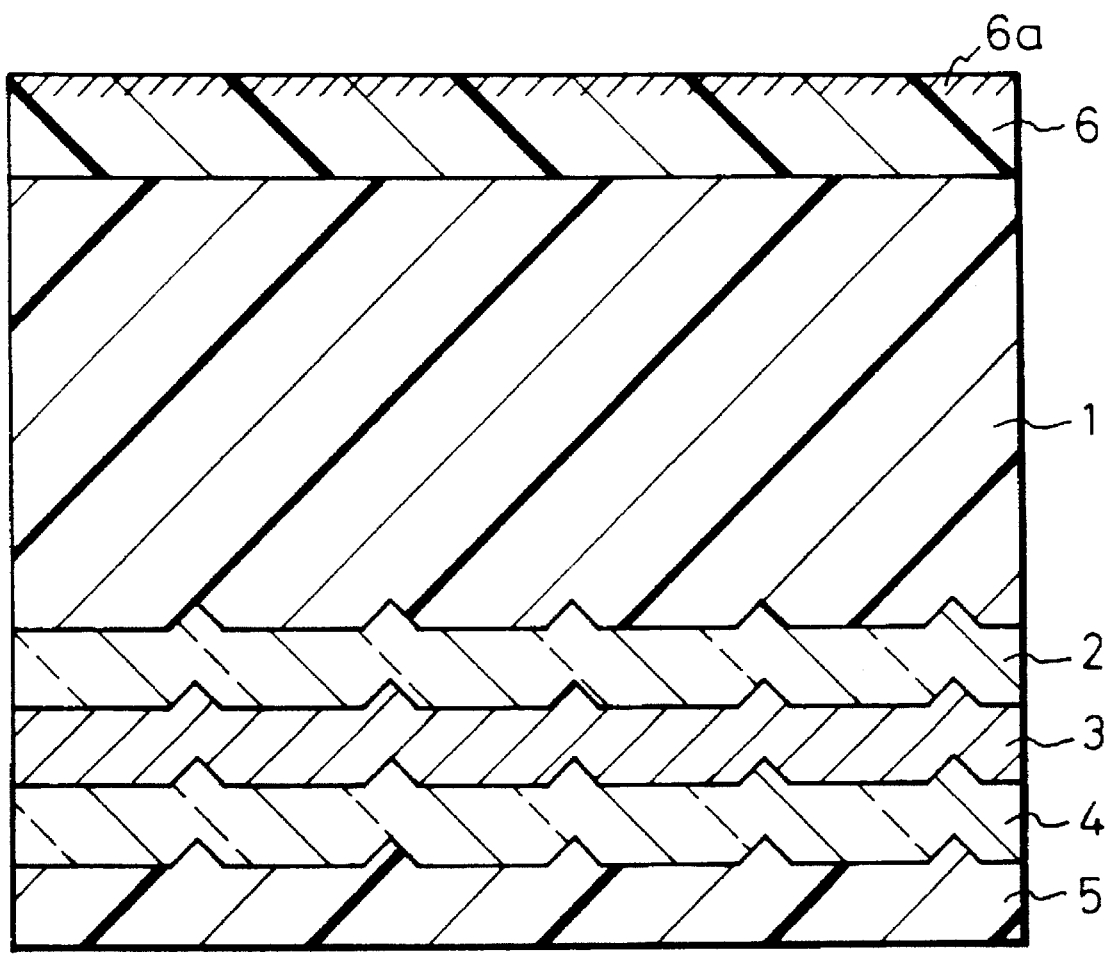

In this specification including the claims, the term "(meth)acrylate" is used to mean "acrylate and methacrylate" or "acrylate or methacrylate" and the term "(iso)cyanuric acid" is used to mean "cyanuric acid and isocyanuric acid" or "cyanuric acid or isocyanuric acid".

The characteristic feature of the first aspect of the present invention is a formation of a coated resin layer having a group reactive with a quaternary compound-forming reagent on a surface of a resin article and the anti-static property is given to only the surface of the coated resin layer by surface treatment of a quaternary compound-forming reagent to cause a chemical conversion of said surface.

The chemical conversion is made by a reaction of the quaternary compound-forming reagent with the coated resin layer. The quaternary compound-forming reagent reacts with the reacive group exposed on the surface of the coated resin layer to form a chemical bond therebetween. The thus chemically converted surface of the coated resin layer has an anti-static property. The chemical bond between the quaternary compound-forming reagent and the reactive group of the coated resin layer is formed predominantly on the surface of the coated resin layer, but it is possible that said chemical bond is also formed inside the layer by a penetration of some, very little, quaternary compound-forming reagents into a region of the resin layer near the surface thereof. On the other hand, once the quaternary compound-forming reagents react with all or almost all exposed reactive groups of the resin layer, it is not possible or is difficult to further form said chemical bonds over the reacted quaternary compound-forming reagents. The quaternary compound-forming reagents existing over the reacted quaternary compound-forming reagents are not necessary or even undesiarable and are therefore preferably removed, for example, by heating, etc.

The thickness or depth of the chemical conversion is not possible to be exactly measuered because the boundary thereof is not clear, but it is generally considered to be between 1 nm to 100 nm and it is sufficient if the quaternary compound-forming reagents bonded to the reactive groups of the resin layer uniformly covers the entire surface of the coated resin layer to exhibit an anti-static property. For example, less than 10 nm may be sufficient.

The synthetic resin of the shaped resin body is not particularly limited and includes, for example, polyesters such as polyethyleneterephthalate and polyethylene-2,6-naphthalate, polycarbonates, polyolefins such as polyethylene and polypropyrene, other vinyl polymers such as polystyrene, polyvinyle chloride, and polymethylmethacrylates, etc.

The shaped body of a synthetic resin of the present invention is not particularly limited and may be in any form such as a film, a sheet, a disc, and etc.

Further, the shaped body may be any one which comprises a resin surface and may be made of a resin only or may be a composite of a resin with another material. In this respect, it is noted that an audio tape, a video tape, an optical disc such as a compact disc (CD) or a laser disc (LD), and a casing of an OA equipment, etc. are included in the definition of the shaped body of a synthetic resin of the present invention.

For example, a magneto-optical recording disc, as an example of an optical disc, comprises a glass or synthetic resin substrate and a magneto-optical recording layer formed thereon, and may include a synthetic resin substrate or a synthetic resin top protecting layer opposite to the substrate. At least either side of the optical disc should be transparent to the light, and therefore, an anti-static coating layer should not lower the optical properties of the optical disc.

A first preferred amino group-containing polymer used to form the coated resin layer of the present invention is a polymer containing at least an amino group-containing monomer as a constituent unit, and the amino group-containing monomer preferably is an amino-containing (meth)acrylate represented by the general formula (I):

where $R^1$ is hydrogen or methyl, $R^2$ is ethylene or propylene, and $R^3$ and $R^4$ each is an alkyl or amino-containing alkyl which may have an N-alkyl substituent or aralkyl.

Examples of the above amino-containing (meth)acrylate include a dialkylaminoethyl(meth)acrylate such as dimethylaminoethylmethacrylate, diethylaminoethylmethacrylate, dimethylaminoethylacrylate and diethylaminoethylacrylate; monoalkylaminoethyl (meth)acrylate such as ethylaminoethylmethacrylate, methylaminoethylmethacrylate, ethylaminoethylacrylate and methylaminoethylacrylate; and alkylaminopropyl(meth) acrylate such as dimethylaminopropylmethacrylate and diethylaminopropylmethacrylate.

The amino group-containing (meth)acrylate unit is preferably contained in an amount of 0.1 to 40 mole %, more preferably 1 to 30 mole %, of the total units of the amino group-containing polymer.

The amino group-containing monomer may be copolymeraized with other monomers, if necessary, for improvement of the properties of the resin layer or other purposes. Examples of such other monomers that can by other constitutent units of the polymer of the coated resin layer include epoxyacrylates derived from novolak-epoxides, phenol novolak-epoxides and bisphenol-A-epoxides, aliphatic acid-modified epoxyacrylates, polyesteroligourethaneacrylates, urethaneacrylates of polyfunctional hydroxy compounds, polyfunctional aliphatic (meth)acrylates such as polybutadieneacrylate, pentaerythritoltetra(meth)acrylate, dipentaerythritolhexa (meth)acrylate, trimethylolpropanetri(meth)acrylate and di(meth)acrylate of (poly)alkyleneglycol, polyfunctional oligoesteracrylates, polyfunctional polyesteracrylates, acrylates of phosphazen compounds, other vinyl-polymerizable compounds, monofunctional acrylates such as methylmethacrylate or butylacrylate, etc. Further, the amino group-containing polymer of the present invention may be a mixture of such a polymer containing at least an amino group as above with another polymer and said another polymer may be, for example, general solvent-soluble polymers such as polyurethanes, linear polyesters and soluble nylon.

The amino group-containing polymer containing (meth) acrylate as the amino group-continuing constituent unit may be obtained by a polymerization of a mixture of the amino group-containing (meth)acrylate, the coplymerizable monomer, and a radical polymerization initiator under conditions of, for example, a predetermined temperature in a nitrogen atmosphere. The radical polymerization initiator may be benzoylperoxide, dicumylperoxide, azobisisobutyronitrile or other known compounds. This amino group-containing polymer may be obtained also by curing a curable composition containing the amino group-containing (meth)acrylate and the coplymerizable monomer together with a photopolymerization initiator.

Examples of the preferable photopolymerization initiator include a benzophenone-based initiator such as benzophenone and Michler's ketone, diketone-based initiator such as benzil and phenylmethoxydiketone, acetophenone-based initiator such as acetophenone, benzoin-based initiator such as benzoinethylether and benzildimethylketal, thioxanthone-based initiator such as 2,4-diethylthioxanthone, quinone-based initiator such as 2-methylanthraquinone and camphorquinone, and others. The amount of the photopolymerization initiator is preferably 0.1 to 10 phr, particularly 1 to 5 phr.

The thickness of the resin coating layer of this amino group-containing polymer derived from the amino group-containing (meth)acrylate is preferably 0.1 to 50 μm, more preferably 1 to 20 μm.

This amino group-containing polymer is coated on a shaped body of a synthetic resin. The amino group-containing polymer to be coated is optionally diluted with an adequate solvent for an improvement of the coating ability or workability, etc.

The coating may be carried out by a known method such as spin coating, dip coating, doctor knife coating, bar coater coating, spraying coating, roll coating, etc.

The resin layer of the amino group-containing polymer may be also obtained by coating said photo-curable composition on a shaped body of a synthetic resin and then irradiating the composition with light such as ultra-violet ray.

Another preferred amino group-containing polymer of the present invention is a polymer containing as a constituent unit an amino group-containing alkoxysilane represented by the following formula (II):

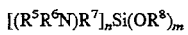

where $R^5$ and $R^6$ stand for hydrogen, aminoalkyl or alkyl, $R^7$ stands for alkylene, $R^8$ stands for 1 to 4 carbon atom-containing alkyl or aralkyl, n and m are integers, and the formulae: $n \geq 1$, $m \geq 2$ and $n+m=4$ are satisfied.

Preferred examples of this amino group-containing alkoxysilane include γ-aminopropyltrimethoxysilane, γ-dimethylaminopropyltrimethoxysilane, γ-diethylaminopropyltrimethoxysilane, γ-methylaminopropyltrimethoxysilane, γ-aminopropyltriethoxysilane, γ-dimethylaminopropyltriethoxysilane, γ-diethylaminopropyltriethoxysilane, γ-methylaminopropyltriethoxysilane, N-β(aminoethyl) γ-aminopropyltrimethoxysilane, N-β(aminoethyl) γ-aminopropyltriethoxysilane, and bis(γ-aminopropyl) dimethoxysilane, etc.

Also, a polymer containing as a constituent unit an amino group-containing alkoxy titanium compound repersented by the following formula (III):

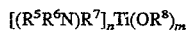

where $R^5$ and $R^6$ stands for hydrogen, aminoalkyl or alkyl, $R^7$ stands for alkylene, $R^8$ stands for 1 to 4 carbon atom-containing alkyl or aralkyl, n and m are integers, and the formulae: $n \geq 1$, $m \geq 2$ and $n+m=4$ are satisfied, is a preferred amino group-containing polymer of the present invention.

Preferred examples of this amino group-containing alkoxytitanium compound include γ-aminopropyltrimethoxytitanium, γ-dimethylaminopropyltrimethoxytitanium, γ-diethylaminopropyltrimethoxytitanium, γ-methylaminopropyltrimethoxytitanium, γ-aminopropyltriethoxytitanium, γ-dimethylaminopropyltriethoxytitanium, γ-diethylaminopropyltriethoxytitanium, γ-methylaminopropyltriethoxy-titanium, N-β(aminoethyl)γ-aminopropyltrimethoxytitanium, N-β(aminoethyl)γ-aminopropyltriethoxytitanium, and bis(γ-aminopropyl) dimethoxytitanium, etc.

Further, oligolmers of these compounds may be also a constituent unit of the amino group-containing polymer. Such an oligomer may be dimer to icosamer, preferably dimer to decamer.

In the amino group-containing polymer, the amino group-containing alkoxysilane, amino group-containing alkoxy titanium compound or oligomer thereof may be copolymeraized with other monomers or mixed with other polymers for improvement of the properties of the coated resin layer or the processability. Such copolymeraizable other monomers and polymers can be ones as mentioned above in respect to the amino group-containing polymer derived from the amino group-containing (meth)acrylate.

The thickness of the resin coating layer of an amino group-containing polymer derived from at least one of said amino group-containing alkoxysilane, amino group-containing alkoxytitanium and oligomer thereof is preferably 0.01 to 100 μm, more preferably 0.1 to 20 μm.

In these cases, the resin coating layer of an amino group-containing polymer is formed by coating the surface of a shaped synthetic resin body with at least one of said amino group-containing alkoxysilane, amino group-containing alkoxytitanium compound or oligomer thereof, and then effecting a condensation reaction of these compounds.

Said at least one of the amino group-containing alkoxysilane, amino group-containing alkoxytitanium compound and oligomer thereof may be coated on the shaped body of a synthetic resin as a solution with a concentration of, for example, 2 to 80% by weight, optionally containing an organic acid such as acetic acid or an inorganic acid such as chloric acid or sulfuric acid. The solvent of said solution may be any adequate organic solvent. Alcohol, particularly a lower alcohol such as methanol, ethanol, isopropanol, etc. is preferred as the solvent.

The coating may be carried out by the methods as mentioned above.

The compound coated on the shaped body may be heated, if necessary, for a time of from several minutes to one hour, to cause a condensation reaction and form a coating of a polymer of the amino group-containing silicate or titanate.

A polymer containing (meth)acrylate of (iso)cyanuric acid as a constituent unit can be also used to form the coated resin layer of the first aspect of the present invention and includes mono-, di- and/or tri-(meth)acrylates of (iso) cyanuric acid. Tri(meth)acrylate of (iso)cyanuric acid is preferred.

In the polymer containing (meth)acrylate of (iso)cyanuric acid as a constituent unit, the (meth)acrylate of (iso)cyanuric acid may be copolymeraized with other monomers, if necessary, for improvement of the properties of the coated resin layer or processability. Such copolymeraizable monomers can be ones as mentioned above in respect to the amino group-containing (meth)acrylate.

The coated resin layer of the polymer containing (meth) acrylate of (iso)cyanuric acid as a constitutent unit is preferably formed by coating on a shaped body of a synthetic resin a photo curable composition comprising mono-, di- and/or tri-(meth)acrylates of (iso)cyanuric acid, said other polymerizable monomer and a photopolymerization initiator and then irradiating the coated photo-curable composition with a high energy ray such as ultra violet ray.

The amount of the (meth)acrylate of (iso)cyanuric acid in the curable composition is preferably 0.5 to 40% by weight. If this amount is less than 0.5% by weight, the obtainable anti-static property is insufficient and if this amount is more than 40% by weight, the performances such as the hardness and water resistance of the coated resin layer are deteriorated.

The photopolymerization initiator may be those as mentioned before for copolymerization with the amino group-containing monomer. The amount of the photopolymerization initiator is preferably 0.1 to 10 phr (parts per handred resin), more preferably 1 to 5 phr.

The thickness of the resin coating layer of a polymer containing (meth)acrylate of (iso)cyanuric acid as a constituting unit is preferably 0.1 to 50 μm, more preferably 1 to 20 μm.

The coating may be carried out by the methods as metioned above.

After a surface of a shaped body of a synthetic resin is coated with an amino group-containing polymer or a polymer containing (meth)acrylate of (iso)cyanuric acid as a constituent unit, the surface of the obtained coated resin layer is treated with a quaternary compound-forming reagent (quaternarizing agent).

As described before, this surface treatment with the quaternary compound-forming reagent is a chemical conversion of the surface of the coated resin layer, not a formation of an overlying layer of the reagent.

The quaternary compound-forming reagent used in the present invention includes sulfates, sulfonates, phosphates and halides. The sulfates include alkyl sulfates, for example, dialkyl sulfates such as dimethyl sulfate, diethyl sulfate and dipropyl sulfate. The sulfonates include aromatic sulfonates such as methyl (p-toluene sulfonate) and methyl (benzene sulfonate) and aliphatic sulfonates such as methyl (methane sulfonate), ethyl (methane sulfonate), methyl (propanesulfonate) and methyl (trifluoromethanesulfonate). The phosphates include trimethylphosphate. The halides include, for example, alkyl chloride and benzyl chloride. Any one or a mixture of these reagents may be used in said surface treatment. The alkyl sulfates and sulfonates are particularly preferable due to the stability of the quaternary compound-forming reagent upon heating.

Further, dialkyl sulfates and sulfonates are also preferred and chloride compounds are not preferred when the present invention is applied to an optical recording medium, particularly a magneto-optical recording medium, because they may attack the magneto-optical recording material and cause a deterioration of the properties thereof.

The surface treatment of the resin coating layer may be carried out by using the quaternary compound-forming reagent, optionally dissolved in an organic solvent such as ethanol. The quaternary compound-forming reagent may be applied onto the surface of the coated resin layer of the shaped body by any adequate method, for example, by dipping the shaped body in a solution of a quaternary compound-forming reagent. The concentration of the solution is preferably 5 to 100% by weight, more preferably 20 to 80% by weight, from the viewpoint of the handling.

By this treatment, the quaternary compound-forming reagent chemically reacts with the amino group of the amino group-containing polymer to form a quaternary ammonium salt only on the top surface of the resin coating layer, or chemically reacts with the (meth)acrylate of (iso)cyanuric acid of the polymer to form a hydrophilic group only on the top surface of the resin coating layer. Namely, the surface of the coated resin layer is chemically converted to exhibit an anti-static property.

The above chemical reaction is generally conducted at the room temperature or at an elevated temperature. The chemical reaction may be accelerated by heating to a preferable temperature, for example, 150° C. or less for the polyester film and 100° C. or less for the polycarbonate disc.

It is sufficient for the purposes of the present invention if the chemical conversion uniformly covers the surface of the coated resin layer. The quaternary compound-forming reagent further adhered over the chemically converted surface of the resin layer is not necessary or even undesired and, therefore, shoud be preferably removed, for example, by heating. As mentioned before, the boundary of the chemical conversion is not clear and it is difficult to exactly determine the thickness or depth of the chemical conversion. The thickness or depth of the chemical conversion is generally considered to reange from 1 nm to 100 nm.

The obtained resin article may preferably have an electrical surface resistivity (hereinafter referred to as "surface resistivity") of less than $10^{14}$ Ω/□ (Ω/square), more preferably less than $10^{13}$ Ω/□, on the surface of the resin article. If the surface resistivity is higher, the anti-static property is not satisfied. The surface resistivity of the resin article may be controlled by the content of the amino group-containing monomer or (meth)acrylate of (iso)cyanuric acid, the amount of the quaternary compound-forming reagent, and the like.

In the first aspect of the present invention, since the chemical conversion exhibiting an anti-static property is based on a chemical bond, the anti-static property of the resin article is stable even under conditions of a high temperature and high humidity.

Further, since the body of the coated resin layer does not contain a reagent for providing an anti-static property, the resin layer can retain the original properties of the resin layer including mechanical, optical and other properties. For example, it may be a transparent resin layer which is suitable for an optical recording medium, etc.

In the second aspect of the present invention, there is also provided a resin article comprising a shaped body of a synthetic resin covered with an anti-static coating layer, said anti-static coating layer being made of a reaction product of at least one selected from the group consisting of an amino group-containing alkoxy silane having the general formula (II), an amino group-containing alkoxy titanium compound having the general formula (III), and an oligomer thereof, with a quaternary compound-forming reagent:

$$[(R^5R^6N)R^7]_n Si(OR^8)_m \qquad (II)$$

$$[(R^5R^6N)R^7]_n Ti(OR^8)_m \qquad (III)$$

where $R^5$ and $R^6$ stands for hydrogen, aminoalkyl or alkyl, $R^7$ stands for alkylene, $R^8$ stands for alkyl having 1 to 4 carbon atoms or aralkyl, n and m are integers, and the formulae: n≧1, m≧2 and n+m=4 are satisfied.

In this second aspect, it is found that this anti-static coating layer is stable even under conditions of a high temperature and high humidity, probably because the quaternary compound-forming reagent is chemically bonded to the polymer and the amino group-containing alkoxy silane, amino group-containing alkoxy titanium compound and oligomers thereof have a high adhesion to resins, in this case, the synthetic resin of the shaped body. As a result, this anti-static coating layer can be durable and relatively thin.

The shaped body of a synthetic resin of this second aspect of the present invention is not particularly limited and may be any one as mentioned before with respect to the first aspect of the present invention.

The examples of the amino group-containing alkoxy silane having the general formula (II), amino group-containing alkoxy titanium compound having the general formula (III), and oligomer of these compounds are also ones as mentioned bebore.

The examples of the quaternary compound-forming reagent are also ones as mentioned before.

The reaction of the amino group-containing alkoxy silane, amino group-containing alkoxy titanium compound and oligomer thereof and the quaternary compound-forming reagent is carried out by dissolving and mixing these compounds with additional monomers, if any, in a solvent. The solvent is not particularly limited if it can dissolve the reactants and does not react with the reactants or the products. The solvent may be alcohol, ether, etc., with alcohol being preferred and lower aliphatic alcohol being particularly preferred. The reaction is desirably carried out with stirring while being cooled.

The mixing ratio of the amino group-containing alkoxy silane or amino group-containing alkoxy titanium compound or oligomer thereof and the quaternary compound-forming reagent is preferably such that the amount of the former is excess to the latter. If the latter is excess, the unreacted quaternary compound-forming reagent may remain on the surface of the coating layer and a hydrolyzate of the quaternary compound-forming reagent may deteriorate the periphery of the coating layer. Conversely, the amino group-containing alkoxy silane or amino group-containing alkoxy titanium compound or oligomer thereof is a type of a surface treating agent, and excess amino group-containing alkoxy silane or amino group-containing alkoxy titanium compound or oligomer thereof remained on the surface of the coating layer does not cause problems as long as the surface resistivity of the coating layer is within the desired range. The mixing ratio of the amino group-containing alkoxy silane or amino group-containing alkoxy titanium compound or oligomer thereof to the quaternary compound-forming reagent is 110 to 600 mole %, preferably 120 to 500 mole % of the former to 100 mole % of the latter. If the former is over 600 mole %, the surface resistivity may be too much, over $10^{14}$ Ω/□, and if it is less than 110 mole %, unreacted quaternary compound-forming reagent may remain and hydrizates thereof may disadvantageously affect the coating layer, etc.

The coating of the above mixture can be carried out by any known method, for example, spin coating, dip coating, doctor knife coating, bar coater coating, gravure coating, roll coating, spray coating, etc., depending on, for example, the shape of the shaped body to be coated.

When a spin coating method is used for applying said mixture to an optical disc in a clean room, it is preferred that a coating composition does not contain a solvent and has a viscosity of less than 20 poise, more preferably less than 10 poise, particularly less than 5 poise to control the thickness of the coating.

The thickness of the anti-static coating layer of the second aspect of the present invention is 0.01 to 30 μm, preferably 0.5 to 5 μm. If the thickness is less than 0.01 μm, a desired surface resistivity is not obtained and if it is more than 30 μm, the control of the layer thickness is difficult, the hardness of the layer may be insufficient, or the performances of the layer are unstable.

The surface resistivity of the resin article is preferably less than $10^{14}$ Ω/□, more preferably less than $10^{13}$ Ω/□, from the viewpoint of the anti-static property.

EXAMPLES

The present invention will be described with reference to examples, in which the "%" and "parts" are based on the weight and the surface resistivity and the durability to environment were measured by the following methods, unless otherwise specified:

Surface resistivity:
Measured based on JIS K-6911.
Durability to environment (Environment test):
Held in an atmosphere at 80° C. and
85% RH for 500 hours.

Examples 1 to 8

The mixtures A, B and C having the compositions as shown in Table 1 were stirred under a nitrogen atmosphere at 80° C. for 6 hours, to polymerize same and form methacrylate-based polymer solutions containing about 10, 20 and 30 parts of dimethylaminoethylacrylate. The solutions were then diluted with toluene to form coating compositions A, B and C each having a solid content of 10%.

TABLE 1

|  | A(parts) | B(parts) | C(parts) |
|---|---|---|---|
| Dimethylaminoethylmethacrylate | 10.0 | 20.0 | 30.0 |
| Methylmethacrylate | 33.3 | 29.5 | 25.8 |
| n-Butylmethacrylate | 47.7 | 42.4 | 37.1 |
| n-Laurylmethacrylate | 9.0 | 8.0 | 7.0 |
| Benzoylperoxide | 0.5 | 0.5 | 0.5 |
| Toluene | 300 | 300 | 300 |

Each of the above solutions was coated on a polyethylene terephthalate (PET) film in a wet thickness of the coated layer of about 10 μm, by a bar coater, and then dried. The obtained coated layers are referred to as coated layers A, B and C. Each of the PET films having the coated layer was cut into a disc having a diameter of about 13 cm and set on a spin coater with an adhesive tape.

An ethanol solution of diethylsulfate having a concentration as shown in Table 2 was spin-coated onto the coated layers A, B and C, and dried in air. The thicknesses of the obtained coated layers were considered to be less than 0.1 μm by weight measurement. The coated PET film was heated in an oven at 80° C. for about 10 minutes and the surface resistivity of the thus-obtained laminates ("before test"), and the laminates after the environment test ("after test"), were measured. The results are shown in Table 2.

TABLE 2

| Example no. | Coating layer | Conc. of diethyl-sulfate (%) | Surface resistivity (Ω/□) | |
|---|---|---|---|---|
|  |  |  | Before test | After test |
| 1 | A | 50 | $6.72 \times 10^{10}$ | $8.00 \times 10^{10}$ |
| 2 | A | 30 | $2.20 \times 10^{11}$ | $3.21 \times 10^{11}$ |
| 3 | A | 10 | $3.96 \times 10^{13}$ | $4.01 \times 10^{13}$ |
| 4 | B | 30 | $1.40 \times 10^{10}$ | $2.50 \times 10^{10}$ |
| 5 | B | 10 | $5.59 \times 10^{10}$ | $7.80 \times 10^{10}$ |
| 6 | C | 100 | $1.05 \times 10^{12}$ | $1.20 \times 10^{12}$ |
| 7 | C | 50 | $1.90 \times 10^{9}$ | $2.83 \times 10^{9}$ |
| 8 | C | 30 | $1.60 \times 10^{10}$ | $2.85 \times 10^{10}$ |

Comparative Example 1

The surface resistivity of an uncoated PET film as used in Example 1 was measured to be more than $10^{16}$ Ω/□.

Examples 9 to 20

The UV curable compositions D, E and F containing about 10, 20 and 30 parts respectively of dimethylaminoethylacrylate as shown in Table 3 were prepared. These UV curable compositions D, E and F each were spin-coated on a polycarbonate substrate for an optical disc having a thickness of 1.2 mm and a diameter of 130 mm to form a coated layer having a wet thickness of about 10 μm. The coated layer was cured by irradiation with a high pressure mercury lamp. The thus obtained discs are referred to as the UV cured discs D, E and F.

TABLE 3

|  | D(parts) | E(parts) | F(parts) |
|---|---|---|---|
| Dimethylaminoethylmethacrylate | 10.0 | 20.0 | 30.0 |
| Phenolnovolakepoxyacrylate | 18 | 16 | 14 |
| Trimethylolpropanetriacrylate | 54 | 48 | 42 |
| Neopentylglycodiacrylate | 18 | 16 | 14 |
| Darocure 1173 (Merk Inc.; α-hydroxybutylphenone) | 3 | 3 | 3 |

An ethanol solution of diethylsulfate having the concentration as shown in Table 4 was spin-coated onto each of the UV cured discs D, E and F, and dried in an oven at 80° C. for 10 minutes. The surface resistivity of the thus obtained discs, and the discs after the environment test, were measured. The results are shown in Table 4.

TABLE 4

| Example no. | Coating layer | Conc. of diethyl-sulfate (%) | Surface resistivity ($\Omega/\square$) Before test | Surface resistivity ($\Omega/\square$) After test |
| --- | --- | --- | --- | --- |
| 9  | D | 100 | $3.39 \times 10^9$    | $4.39 \times 10^9$    |
| 10 | D | 50  | $7.72 \times 10^{10}$ | $6.62 \times 10^{10}$ |
| 11 | D | 30  | $1.10 \times 10^{11}$ | $2.10 \times 10^{11}$ |
| 12 | D | 10  | $1.96 \times 10^{13}$ | $2.06 \times 10^{13}$ |
| 13 | E | 100 | $7.98 \times 10^8$    | $6.98 \times 10^8$    |
| 14 | E | 50  | $3.40 \times 10^{10}$ | $3.55 \times 10^{10}$ |
| 15 | E | 30  | $5.59 \times 10^{10}$ | $5.78 \times 10^{10}$ |
| 16 | E | 10  | $1.05 \times 10^{12}$ | $2.05 \times 10^{12}$ |
| 17 | F | 100 | $1.80 \times 10^9$    | $1.65 \times 10^9$    |
| 18 | F | 50  | $3.61 \times 10^9$    | $4.61 \times 10^9$    |
| 19 | F | 30  | $1.49 \times 10^{10}$ | $2.09 \times 10^{10}$ |
| 20 | F | 10  | $2.65 \times 10^{12}$ | $2.05 \times 10^{15}$ |

Comparative Examples 2 to 5

The surface resistivities of a polycarbonate (PC) substrate for an optical disc having a thickness of 1.2 mm and a diameter of 130 mm and a polyester (PET) film in the form of disc having a thickness of 100 μm and a diameter of 130 mm were measured. Also, an alcohol solution of diethylsulfate was coated on a PC substrate and a PET film as above and the surface resistivities of the thus coated PC substrate and PET film were measured. The results are shown in Table 5.

TABLE 5

| Comparative example no. | Substrate | Diethylsulfate (%) | Surface resistivity ($\Omega/\square$) |
| --- | --- | --- | --- |
| 2 | PC  | 100       | more than $10^{16}$ |
| 3 | PC  | untreated | more than $10^{16}$ |
| 4 | PET | 100       | more than $10^{16}$ |
| 5 | PET | untreated | more than $10^{16}$ |

Examples 21 to 23

In the same procedures as in Examples 9 to 12, the UV curable composition D was coated and cured on a PC substrate for an optical disc having a thickness of 1.2 mm and a diameter of 130 mm. Then quaternary compound-forming reagent solutions as shown in Table 6 each were coated on the disc substrate, dried in air and heated at 80° C. for 30 minutes. The quaternary compound-forming reagent solutions were an ethanol solution having a concentration of 30%. The surface resistivities of the obtained discs are shown in Table 6.

TABLE 6

| Example no. | Substrate | Quaternary compound-forming reagent | Surface resistivity ($\Omega/\square$) |
| --- | --- | --- | --- |
| 21 | PC  | methyl(p-toluene-sulfonate)        | $6.28 \times 10^{12}$ |
| 22 | PC  | methyl(methane-sulfonate)          | $7.88 \times 10^{12}$ |
| 23 | PET | methyl(trifluoro-methanesulfonate) | $5.11 \times 10^{13}$ |

Example 24

A magneto-optical recording disc having the layer structure as shown in FIG. 1 was prepared in accordance with the following procedures. In FIG. 1, 1 denotes a transparent plastic substrate, 2 a dielectric layer, 3 a magneto-optical recording layer, 4 an inorganic protecting layer, 5 an organic protecting layer, and 6 a coated resin layer.

The transparent plastic substrate 1 was made of polycarbonate (PC) resin and had a diameter of 130 mm, a thickness of 1.2 mm. Also the transparent plastic substrate 1 had a top surface with 1.6 μm pitch grooves and a flat rear surface. The transparent plastic substrate 1 was set in a vacuum chamber of an RF magnetron sputtering apparatus (ANELVA Corporation SPF-430H) capable of mounting three targets, and the chamber was evacuated to less than $5.3 \times 10^{-5}$ Pa ($4 \times 10^{-7}$ Torr).

Ar gas was introduced into the chamber and the flow rate of the Ar gas was regulated to a pressure of $4.2 \times 10^{-5}$ Pa ($3 \times 10^{-7}$ Torr). A 75 nm thick ZnS layer was deposited as the dielectric layer 2, by RF sputtering, using a target of a ZnS disc with a diameter of 100 mm and a thickness of 5 mm, and an electrical discharge at a power of 100 W, and an RF of 13.56 MHz.

Then the target was changed to a TbFeCo (atomic ratio of 23:69:8) alloy target, Ar gas was introduced, and RF sputtering was conducted under the same discharge conditions as above, to thereby deposit a TbFeCo alloy layer as the magneto-optical recording layer 3, 80 nm thick. Further, the target was changed to AlN, a mixture gas of Ar and $N_2$ (Ar:$N_2$=90:10 by volume) was introduced, the total pressure was regulated to 1.3 Pa ($1 \times 10^{-2}$ Torr) and an RF sputtering was conducted at an electric discharge power of 67 W to deposit an AlN layer 4, 50 nm thick.

Then, on the AlN layer 4, an ultra-violet ray curable acrylate resin mixture (SD=301; Dainippon Ink and Chemicals, Incorporated) was coated by a spin coating method to a wet thickness of 10 μm, and cured with UV ray irradiation to form an organic protecting layer 5.

Then, an anti-static treatment was carried out on the flat rear surface of the disc in accordance with the same procedures as in Example 11, to thereby obtain a magneto-optical recording disc having a coated resin layer 6 exhibiting an anti-static property. As shown in FIG. 1, only the surface 6a of the coated resin layer 6 is chemically converted with a quaternary compound-forming reagent to exhibit the anti-static property and the remaining portion of the coated resin layer 6 retains the original properties of the resin.

Comparative Example 6

The procedures of Example 24 were repeated except for the anti-static treatment of Example 24 on the flat rear surface of the disc. Then, UR-4502 (Mitsubishi Rayon), a hard coating resin containing an anti-static agent was coated on the flat rear surface of the disc in the same thickness as that of Example 24, and cured by UV ray irradiation.

Of these two magneto-optical recording discs, the typical performances were measured as prepared (before test), and after an environment test at 80° C. and 85% RH for 2000 hours (after test). The surface resistivity was measured on the flat rear surface of the discs. The bit error rate (BER) was measured in accordance with ISO-10089.

TABLE 7

| | Before test | | | After test[1)] | | |
|---|---|---|---|---|---|---|
| Sample | C/N | BER | Surface resistivity ($\Omega/\square$) | C/N | BER | Surface resistivity ($\Omega/\square$) |
| Ex. 24 | 48.4 | $3.8 \times 10^{-8}$ | $1.1 \times 10^{11}$ | 48.4 | $3.8 \times 10^{-8}$ | $3.2 \times 10^{11}$ |
| Co. ex. 6 | 48.7 | $3.6 \times 10^{-8}$ | $5.6 \times 10^{13}$ | 48.7 | $3.6 \times 10^{8}$ | $9.8 \times 10^{14}$ |

Note 1) The environment test was at 80° C. and 85% RH for 2000 hours in Comparative example 6.

Examples 25 to 30

Polyethyleneterephthalate (PET) films having a thickness of 50 µm and polycarbonate (PC) discs having a diameter of 130 mm and a thickness of 1.2 mm were prepared and coated with a 5% ethanol solution of each of the compounds as shown in Table 8 (the compounds are referred to as "primer") by a bar coater to a wet thickness of about 5 µm, which was heated at 80° C. for 60 minutes to condense the primer.

Then 30% ethanol solution of diethylsulfate was coated on the primer coated layer to a wet thickness of 1 µm, dried in air and heated in an oven at 80° C. for about 5 minutes. The thicknesses of the coated diethylsulfate layers were considered to be less than 0.1 µm from the weight measurement.

The surface resistivities of the thus prepared films and discs and those after the environment test were measured. The results are shown in Table 8. In Table 8, the terms "P1", "P2" and "P3" refer to isopropyltri(N-aminoethyl)titanate, γ-aminopropyltriethoxysilane and an oligomer of γ-aminopropyltriethoxysilane (average polymerization degree of 3), respectively.

TABLE 8

| Example no. | Shaped article | Primer | Surface resistivity ($\Omega/\square$) | |
|---|---|---|---|---|
| | | | Before test | After test |
| 25 | PET film | P1 | $4.55 \times 10^{10}$ | $6.00 \times 10^{10}$ |
| 26 | PET film | P2 | $4.78 \times 10^{10}$ | $5.18 \times 10^{10}$ |
| 27 | PET film | P3 | $3.05 \times 10^{12}$ | $3.10 \times 10^{12}$ |
| 28 | PC disc | P1 | $4.62 \times 10^{10}$ | $4.60 \times 10^{13}$ |
| 29 | PC disc | P2 | $2.10 \times 10^{11}$ | $2.80 \times 10^{11}$ |
| 30 | PC disc | P3 | $3.06 \times 10^{13}$ | $3.46 \times 10^{13}$ |

Comparative Examples 7 to 14

The procedures of Examples 26 to 31 were repeated, except that the ethanol solution of diethylsulfate was not coated on the PET films and the PC discs. The surface resistivities of the thus obtained PET films and PC discs with the primer coating layer were measured. The results are shown in Table 9.

TABLE 9

| Comparative example no. | Shaped article | Primer | Surface resistivity ($\Omega/\square$) |
|---|---|---|---|
| 7 | PET film | non | $>10^{16}$ |
| 8 | PET film | P1 | $>10^{16}$ |
| 9 | PET film | P2 | $>10^{16}$ |
| 10 | PET film | P3 | $>10^{16}$ |
| 11 | PC disc | non | $>10^{16}$ |
| 12 | PC disc | P1 | $>10^{16}$ |
| 13 | PC disc | P2 | $>10^{16}$ |
| 14 | PC disc | P3 | $>10^{16}$ |

Examples 31 to 34

A UV curable composition containing 20 parts of tris-acryloxyethylisocyanurate, as shown in Table 10, was prepared and coated by spin coating on a polycarbonate (PC) substrate for an optical disc having a thickness of 1.2 mm and a diameter of 130 mm in a wet thickness of about 10 µm, which was cured by irradiation with a mercury lamp to form an UV cured disc.

The obtained UV cured disc was coated with an ethanol solution of diethyl sulfate having a concentration as shown in Table 11 by spin coating, air dried and heated in an oven at 80° C. for about 10 minutes.

The surface resistivities of the thus prepared disc and that after the environment test were measured. The results are shown in Table 11.

TABLE 10

| Composition of UV curable composition | parts |
|---|---|
| Tris-acryloxyethylisocyanurate | 20 |
| Phenolnovolakepoxyacrylate | 16 |
| Trimethylolpropanetriacrylate | 48 |
| Neopentylglycoldiacrylate | 16 |
| Darocure 1173 | 3 |

TABLE 11

| Example no. | Concentration of diethyl-sulfate | Surface resistivity ($\Omega/\square$) | |
|---|---|---|---|
| | | Before test | After test |
| 31 | 100% | $8.98 \times 10^{8}$ | $2.00 \times 10^{9}$ |
| 32 | 50% | $2.40 \times 10^{10}$ | $2.60 \times 10^{10}$ |
| 33 | 30% | $3.18 \times 10^{10}$ | $4.10 \times 10^{10}$ |
| 34 | 10% | $2.05 \times 10^{12}$ | $3.00 \times 10^{12}$ |

Comparative Example 15

The UV cured disc of Example 32 had a surface resistivity of more than $10^{16}$ $\Omega/\square$ before the treatment with the diethyl sulfate.

Comparative Example 16

A disc was prepared in accordance with the same procedures as in Example 33, except that the UV curable composition having the composition as shown in Table 12 was used.

The surface resistivity of the obtained disc was measured to be more than $10^{16}$ $\Omega/\square$.

| Composition of UV curable composition | parts |
| --- | --- |
| Phenolnovolakepoxyacrylate | 20 |
| Trimethylolpropanetriacrylate | 60 |
| Neopentylglycoldiacrylate | 20 |
| Darocure 1173 | 3 |

Example 35

A UV curable composition as shown in Table 10 was coated with a wet thickness of about 5 μm by a bar coater on a PET film having a thickness of 50 μm, which film was then cured by irradiation with a mercury lamp to form an UV cured film.

The obtained UV cured film was spin-coated with a 30% ethanol solution of methyl(methane sulfonate), air dried and heated in an oven at 80° C. for about 20 minutes.

The surface resistivity of the thus prepared film was measured to be $3.8 \times 10^{10}$ Ω/□.

Coating Composition 1

Into a charge of 220 parts of γ-aminopropyltriethoxysilane (Nippon Unicar, A-1100) and 220 parts of ethanol in a glass flask, a mixture of 77 parts of diethyl sulfate and 77 parts of ethanol was added dropwise while stirring at 30° C. and then the stirring was continued for 1 hour, to give a reaction mixture of the quaternary ammonium salt of γ-aminopropyltriethoxysilane. This composition is referred to as coating composition 1.

Coating Composition 2

Into a charge of 220 parts of N-β-(aminoethyl)-γ-aminopropylmethoxysilane (Nippon Unicar, A-1120) and 220 parts of ethanol in a glass flask, a mixture of 77 parts of diethyl sulfate and 77 parts of ethanol was added dropwise while stirring at 30° C. and then the stirring was continued for 1 hour after the completion of asid addition, to give a reaction mixture of the quaternary ammonium salt of N-β-(aminoethyl)-γ-aminopropylmethoxysilane. This composition is referred to as coating composition 2.

Coating Composition 3

In 1000 parts of 5% ethanol solution of oligomeric silane coupling agent (Nippon Unicar, Oligomer-AP-133) in a glass flask, a mixture of 10 parts of diethyl sulfate and 10 parts of ethanol was added dropwise while stirring at 30° C. and then the stirring was continued for 1 hour, to give a reaction mixture of the quaternary ammonium salt of the silane coupling agent. This composition is referred to as coating composition 3.

Examples 36 to 38

The coating compositions 1 to 3 each were spin-coated onto a flat rear surface of a polycarbonate disc substrate for a magneto-optical recording disc having a thickness of 1.2 mm and a diameter of 130 mm, dried at the room temperature and heat treated at 80° C. for 10 minutes. The thickness of the coated layer was less than 1 μm.

The surface resistivities of the thus obtained disc substrates were measured. Then the disc substrates were immersed in water at 70° C. for 16 to 24 hours and dried. After drying, the surface resistivities of the disc substrates were again measured. The results are shown in Table 13.

The surface hardness of the coated layers of the disc substrates were measured to be F or more of the pencil hardness, which suggests that they are sufficiently hard for a hard coat layer of an optical recording medium. In contrast, the disc substrates without the coated layer had a surface hardness of 2 B.

Comparative Example 17

An anti-static agent "Highboron SCI" (Boron International) was coated, dried and heated on a disc substrate as used in Examples 35 to 37 in the procedures similar to those of Examples 35 to 37. The thickness of the coated layer was less than 1 μm.

The environment test and measurement as in Examples 37 to 39 were conducted for the disc substrates. The results are shown in Table 13.

TABLE 13

| | Surface resistivity (Ω/□) | |
| --- | --- | --- |
| Sample | Before test | After test |
| Ex. 36 | $5.3 \times 10^{10}$ | $6.8 \times 10^{10}$ |
| Ex. 37 | $2.3 \times 10^{12}$ | $2.8 \times 10^{12}$ |
| Ex. 38 | $6.8 \times 10^{12}$ | $3.5 \times 10^{12}$ |
| Co. ex. 17 | $2.4 \times 10^{9}$ | $3.5 \times 10^{14}$ |

Examples 39 to 41

The coating compositions 1 to 3 each were coated by a bar coater onto a polyester film having a thickness of 100 μm, dried at the room temperature and heat treated at 80° C. for 10 minutes. The thickness of the coated layer was less than 1 μm.

The surface resistivities of the obtained disc substrates were measured. Then the disc substrates were immersed in water at 70° C. for 16 to 24 hours and dried. After said drying, the surface resistivities of the disc substrates were again measured. The results are shown in Table 14.

Comparative Example 18

An anti-static agent "Highboron SCI" (Boron International) was coated, dried and heated on a film as used in Examples 39 to 41 in the procedures similar to those of Examples 39 to 41. The thickness of the coated layer was less than 1 μm.

The environment test and measurement as in Examples 39 to 41 were conducted for the films. The results are shown in Table 14.

TABLE 14

| | Surface resistivity (Ω/□) | |
| --- | --- | --- |
| Sample no. | Before test | After test |
| Ex. 39 | $5.8 \times 10^{10}$ | $5.2 \times 10^{10}$ |
| Ex. 40 | $2.6 \times 10^{12}$ | $2.1 \times 10^{12}$ |
| Ex. 41 | $6.3 \times 10^{12}$ | $1.5 \text{ '}3 \times 10^{13}$ |
| Co. ex. 18 | $6.4 \times 10^{9}$ | $2.5 \times 10^{14}$ |

We claim:

1. A resin article comprising
   a shaped body of a synthetic resin having a surface, and
   a single coated resin layer covering the surface of the shaped body, said single coated resin layer being made of an amino group-containing polymer and/or a polymer containing (meth)acrylate of (iso)cyanuric acid as a constituent unit and having an exposed top surface, wherein said exposed top surface of the single coated resin layer is chemically converted to have an anti-static property by chemical reaction with a quaternary compound-forming reagent, but the single coated resin layer has an unreacted part adjacent to the surface of the shaped body.

2. A resin article according to claim 1, wherein said quaternary compound-forming reagent is alkyl sulfate and/or sulfonate.

3. A resin article according to claim 1, wherein said resin article has a surface resistivity of less than $10^{14}$ Ω/□.

4. A resin article according to claim 1, wherein said shaped body is a magneto-optical recording medium.

5. A resin article according to claim 1, wherein said shaped body is a polyester film.

6. A resin article according to claim 1, wherein said amino group-containing polymer is at least one polymer selected from the group consisting of polymers containing an amino group-containing (meth)acrylate having the following formula (I), an amino group-containing alkoxy silane having the general formula (II), an amino group-containing alkoxy titanium compound having the general formula (III) and an oligomer thereof, as a constituent unit:

where $R^1$ is hydrogen or methyl, $R^2$ is ethylene or propylene, and $R^3$ and $R^4$ each is alkyl, amino-containing alkyl, or aralkyl,

where $R^5$ and $R^6$ stand for hydrogen, aminoalkyl or alkyl, $R^7$ stands for alkylene, $R^8$ stands for alkyl having 1 to 4 carbon atoms or aralkyl, n and m are integers, and the formulae: $n \geq 1$, $m \geq 2$ and $n+m=4$ are satisfied.

7. A resin article according to claim 1, wherein said amino group-containing polymer comprises an amino group-containing monomer copolymerized with at least one monomer which does not contain an amino group.

8. A resin article according to claim 1, wherein said amino group-containing polymer contains 0.1 to 40 mole % of the amino group-containing constituent unit based on the total constituent units of the amino group-containing polymer.

9. A resin article according to claim 1, wherein the chemically converted top surface of the coated resin layer has a thickness of 1 to 100 nm.

10. A resin article according to claim 1, wherein the coated resin layer has a thickness of 0.01 to 100 μm.

11. A resin article comprising a shaped body of a synthetic resin having a surface, and a single coated resin layer covering the surface of the shaped body, said single coated resin layer being made of an amino group-containing polymer and having an exposed top surface, wherein said exposed top surface of the coated resin layer is chemically converted to have an anti-static property by chemical reaction with at least one alkyl sulfate, aromatic sulfonate, or aliphatic sulfonate quaternary compound-forming reagent, but the single coated resin layer has an unreacted part adjacent to the surface of the shaped body.

12. A resin article as claimed in claim 11, wherein said quaternary compound-forming agent is selected from the group consisting of diethylsulfate, methyl(p-toluenesulfonate), methyl(methane sulfonate) and methyl(trifluoromethanesulfonate).

* * * * *